US012704179B2

(12) United States Patent
Passow et al.

(10) Patent No.: US 12,704,179 B2
(45) Date of Patent: Aug. 11, 2026

(54) RADIAL SHAFT SEAL RING

(71) Applicant: AKTIEBOLAGET SKF, Gothenburg (SE)

(72) Inventors: Christoph Passow, Leichlingen (DE); Hans-Dieter Zander, Cologne (DE)

(73) Assignee: AKTIEBOLAGET SKF, Gothenburg (SE)

( * ) Notice: Subject to any disclaimer, the term of this patent is extended or adjusted under 35 U.S.C. 154(b) by 24 days.

(21) Appl. No.: 18/112,345

(22) Filed: Feb. 21, 2023

(65) Prior Publication Data

US 2023/0272857 A1 Aug. 31, 2023

(30) Foreign Application Priority Data

Feb. 28, 2022 (DE) ........................ 102022202044.8

(51) Int. Cl.
*F16J 15/32* (2016.01)
*F16J 15/3204* (2016.01)

(52) U.S. Cl.
CPC ................................ *F16J 15/3204* (2013.01)

(58) Field of Classification Search
CPC .. F16J 15/3204; F16J 15/3216; F16J 15/3248; F16J 15/3268; F16J 15/3276
See application file for complete search history.

(56) References Cited

U.S. PATENT DOCUMENTS

| | | | | |
|---|---|---|---|---|
| 5,329,898 A * | 7/1994 | Nelson | F02F 11/007 | 123/195 C |
| 5,642,889 A * | 7/1997 | Pauler | F16J 15/3276 | 277/575 |
| 9,062,773 B2 * | 6/2015 | Sedlar | F16J 15/3244 | |
| 9,062,774 B2 * | 6/2015 | Sedlar | F16J 15/3224 | |
| 9,248,699 B2 * | 2/2016 | Giraudo | F16J 15/3256 | |
| 10,240,678 B2 * | 3/2019 | Toth | F16J 15/3284 | |
| 2004/0056427 A1 * | 3/2004 | Rapp | F16J 15/3276 | 277/549 |
| 2010/0187769 A1 * | 7/2010 | Sedlar | F16J 15/3268 | 277/561 |
| 2014/0084672 A1 * | 3/2014 | Giraudo | F16J 15/3256 | 277/351 |

* cited by examiner

*Primary Examiner* — Christine M Mills
*Assistant Examiner* — L. Susmitha Koneru
(74) *Attorney, Agent, or Firm* — J-TEK LAW PLLC; Scott T. Wakeman; Mark A. Ussai

(57) ABSTRACT

A radial shaft seal ring for sealing a space between a shaft and a bore in a housing includes a support body having an axial part, a radial part and a curved connecting part connecting the axial part to the radial part. A seal body is mounted on the support body and has a static seal element configured to seal between the support body and the bore and a dynamic seal element configured to sealingly abut against the shaft. The static seal element extends from the axial part of the support body over the connecting part to the radial part of the support body and includes an axial seal element section and a radial seal element section. A radially outer surface of the static seal element has a radially outwardly directed first seal bead, at least a portion of which is located directly radially outward of the curved connecting part.

11 Claims, 1 Drawing Sheet

RADIAL SHAFT SEAL RING

CROSS-REFERENCE

This application claims priority to German patent application no. 10 2022 202 044.8 filed on Feb. 28, 2022, the contents of which are fully incorporated herein by reference.

TECHNOLOGICAL FIELD

The present invention relates to a radial shaft seal for sealing a shaft received in a housing that provides improved static sealing between a portion of the shaft seal and the housing.

BACKGROUND

Radial shaft seal rings may be used anywhere a rotating component, such as a shaft, must be sealed relative to a stationary component, such as a housing. Here the radial shaft seal ring usually includes a support body that carries a sealing body. The sealing body in turn has a static seal element and a dynamic seal element, the static seal element providing a seal with respect to the stationary component and the dynamic seal element abutting against the rotating component, in particular the shaft, and sealing with respect to it. The static and dynamic seal element are usually produced one-piece from an elastomer material and are vulcanized onto the support body or overmolded on the support body. Furthermore, the dimensions of the static seal element and of the surface of the static component that interacts with the static seal element are dimensioned such that an overlap is present that ensures a press fit of the radial shaft seal in or on the static component.

Particularly in the case of radial shaft seal rings in which a shaft to be received in a housing in a bore is to be sealed, the static seal element may have a larger outer diameter than an inner diameter of the receiving bore.

Furthermore, the static seal element may have a wavy/undulating/scalloped radial abutment surface formed from a plurality of directly adjacent protrusions that creates a good overlap between the static seal element and the static component but does not excessively increase the assembly force that is needed to fit the radial shaft seal ring in/on the fixed component.

In particular with radial shaft seal rings in which a shaft received in a housing in a bore is to be sealed and the static seal element has a larger outer diameter than the inner diameter of the receiving bore, it is disadvantageous that during installation the undulating projections must be pressed radially inward, which requires that the material of the seal element that is pressed inward must be received or accommodated by the radially inner-lying material. For this reason the installation requires a very large effort, which also increases rapidly as the static seal element is inserted further into the bore because ever more material must be pressed inward and accommodated. Particularly at the end of the install installation process, this leads not only to a radially inward deformation but also to an axially directed deforming force, due to which, however, cracks arise on the material of the seal element, which must be avoided.

SUMMARY

An aspect of the present disclosure is therefore to provide a radial shaft seal ring that enables a reliable sealing in the static region and that is at the same time installable using an installation force that remains uniform during the entire installation process.

In the following, a radial shaft seal ring is disclosed for sealing a shaft received in a housing. The housing includes a bore, and the radial shaft seal ring is configured to seal an annular space between the bore and the shaft. The radial shaft seal ring includes a support body that is configured to carry a seal body, and the support body comprises at least one axial part that extends essentially axially and a radial part that extends essentially radially. Both parts are connected to each other by a curved connecting part. Furthermore, the seal body includes a static seal element which, in the installed state, is configured to provide a seal between the support body and the bore and a dynamic seal element, in particular at least one seal lip, which in the installed state is configured to sealingly abut against the rotatable shaft.

The seal body is preferably produced from an elastomer material. Furthermore, the static and the dynamic seal element are preferably configured one-piece. The seal body can be vulcanized and/or overmolded onto the support body or attached to it in another manner, for example, by adhesion.

Furthermore, the static seal element includes an axial seal element section and a radial seal element section, where the radial seal element section at least partially radially outwardly surrounds an outer surface of the axial part of the support body, and the radial seal element section abuts against the radial part of the support body so that the static seal element extends from the axial part of the support body over the curved connecting part to the radial part of the support body.

In order for the seal to be installable using a substantially uniform installation force and to prevent a possible stripping off of the material of the seal element, the axial seal element section includes an outer surface on which a radially outwardly directed seal bead is formed in the region of the connecting part. Here the outer surface extends axially and essentially parallel to the bore in which the radial shaft ring is to be installed.

Due to the arrangement of the seal bead in the region of the connecting part, during the installation of the radial shaft seal ring in the bore, the material of the seal element is pressed into the axial seal element section. This allows the material to deform axially outward so that the installation force that is required to arrange the radial shaft seal ring in the bore is reduced. At the same time, however, due to the presence of the radially inner connecting part near the seal bead, the deformation is not so slight that the abutment force of the seal lip in the installed state would be so severely reduced that a sufficient sealing could no longer be ensured. With the shaft profile known from the prior art, the material of the seal can only be taken up by the seal element in a limited manner so that a compression of the rubber is possible with great effort, and a diverting of the material toward the axial outer side is only possible by tearing the material.

According to one preferred exemplary embodiment, the axially extending outer surface extends along the axial part of the support body up to at least over the curved connecting part, wherein the axial seal element section has a material thickness in the region of the axial part of the support body. The first seal bead thereby points radially outward, which makes possible a radially outwardly directed abutment force of the seal bead in the bore and thus a particularly good sealing. The lengthening of the axial part also thereby makes possible a particularly good seal since the bore seals over a long length of the axial seal element section.

Here it is preferable in particular, as a further preferred exemplary embodiment shows, that due to the shape of the curved connecting part, that the material thickness of the axial sealing element section gradually increases in the region of the connection part due to the shape of the connection part, with the sealing bead being arranged in such a way that it is entirely located in the region of the increasing thickness. Such an arrangement makes possible a particularly good yielding of the elastomer material during the installing process, and at the same time a good return force and installation force that ensures a secure sealing of the seal element in the bore.

According to a further preferred exemplary embodiment, the outer surface of the static seal element includes a second seal bead that is disposed on an end of the axial seal element section facing away from the radial seal element section. This second sealing bead is purely optional and serves as an emergency sealing bead that provides an additional sealing option in case a seal is required between two areas where one area contains a medium with very high pressure or when it must be ensured that no leakage can occur.

If a second seal bead is provided, it is advantageous in particular if the outer surface of the axial seal element section has the same material thickness substantially continuously in a region between first and second seal bead. In other words, no further seal bead is provided between the first and the second seal bead.

This, in turn, allows sufficient space for the second sealing bead to receive the pressed-in material in the axial sealing element section during installation as well.

According to a further advantageous exemplary embodiment, in an uninstalled state an outer diameter of the outer surface of the axial seal element section is dimensioned such that it is smaller than an inner diameter of a bore in which the radial shaft seal ring is to be installed.

Since the outer diameter of the outer surface is smaller than an inner diameter of the bore, sufficient space can be provided for both the first and the optional second seal bead to expand in the neighboring regions without the installation force being increased excessively. It is thereby ensured that only the first and the optional second seal bead abut against the inner bore and that additional elements do not increase the installation force or grindingly abut against the inner bore, which would also increase the required installation force.

According to a further advantageous exemplary embodiment, in an uninstalled state an outer diameter of the static seal element, measured at the first and/or second seal bead, is greater than an inner diameter of the bore in which the radial shaft seal ring is to be installed.

In other words, an overlap is provided between the static sealing element and the bore, which requires the material of the sealing bead to be pressed into the material of the axial sealing element section during installation. This overlap, and in particular the size of the overlap, largely defines the installation force required to install the static seal element in the bore and thus the seal properties of the seal. Moreover, the elasticity or the deformability of the elastomer material of the seal itself influences the installation force. In addition to the secure sealing, the size of the overlap is chosen such that even with an enlarging of a distance between the axial seal element section and the bore due to thermal influences, sufficient sealing is made possible for all operating states. The overlap is chosen here such that on the one hand, the installation forces are not excessively high and on the other hand it is ensured in all operating states that there is a seal between bore and radial shaft seal ring.

This is to be considered in particular when the support body and the housing are produced from different materials. In particular with housings made of aluminum and support bodies made of steel, it must be taken into account that the thermal expansion of the housing is greater than the thermal expansion of the steel so that the distance between the support body and the housing bore increases due to the thermal expansion. This gap must be compensated for by the static seal element, which in turn means that a sufficiently large overlap must be provided to ensure a reliable installation of the static seal element on the inner bore.

According to a further preferred exemplary embodiment, the axial part of the support body includes a first and a second axial section, the second axial section being dimensioned such that it abuts by its outer side against an inner side of the housing bore, and the first axial section is radially inwardly offset from the second axial section. A combined seal-body-support-body outer seat, in particular a combined elastomer-metal outer seat, is thereby provided, wherein the support body abuts at least partially directly against the bore. It is preferred here in particular when in an uninstalled state an outer diameter of the second axial section is dimensioned larger than an inner diameter of the bore in which the radial shaft seal ring is to be installed. Due to the overlap between the support body and the bore, in turn a particularly good seat of the radial shaft seal ring in the bore can be provided.

Furthermore, with a combined seal-body-support-body outer seat, it is provided that the axial seal element section extends only along the first section of the support body. The forces applied during the installation by the elastomer material of the static seal element on the inner bore can thereby also be reduced. At the same time, the axial seal element section ensures a sealing even with different thermal expansion of support bodies and surrounding housing.

As mentioned above, it is preferred in particular that the seal body or the seal elements are produced from an elastomer material, in particular from a rubber. Furthermore, it is preferred that the seal body or the seal elements are produced one-piece and can include one or more seal lips.

Further advantages and advantageous embodiments are specified in the description, the drawings, and the claims. Here in particular the combinations of features specified in the description and in the drawings are purely exemplary so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
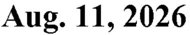
FIG. 1 is a schematic sectional view through an embodiment of a radial shaft seal ring according to the present disclosure.
Figure 1:
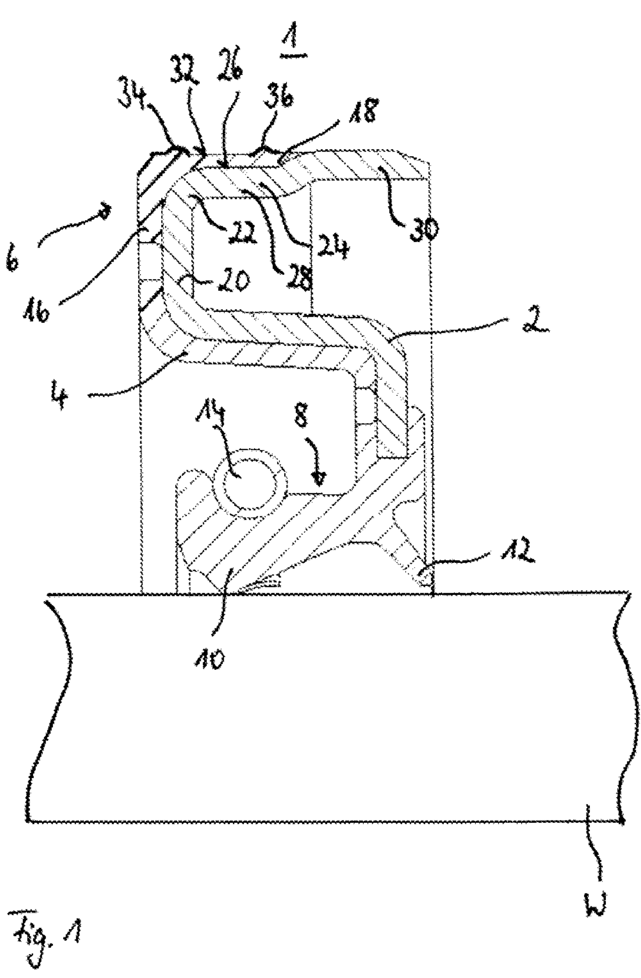

FIG. 1 shows a sectional view through a radial shaft seal ring 1. The radial shaft seal ring includes a support body 2 and a seal body 4 vulcanized thereon. The seal body 4 is preferably produced from an elastomer material, in particular from a rubber, and includes a static seal element 6 and a dynamic seal element 8. The seal body 4 can be produced one-piece. As can further be seen from FIG. 1, the dynamic seal element includes two seal lips 10, 12, the seal lip 12 being configured as a dust lip and the seal lip 10 as a media seal. FIG. 1 furthermore shows that a ring spring 14 is provided that increases the contact force of the seal lip 10 on a shaft W not shown in detail. It is to be noted here that the dynamic seal element 8 shown here is only an example, and of course any other known dynamic seal element designs can be present for sealing with respect to the shaft W.

Figure 2:
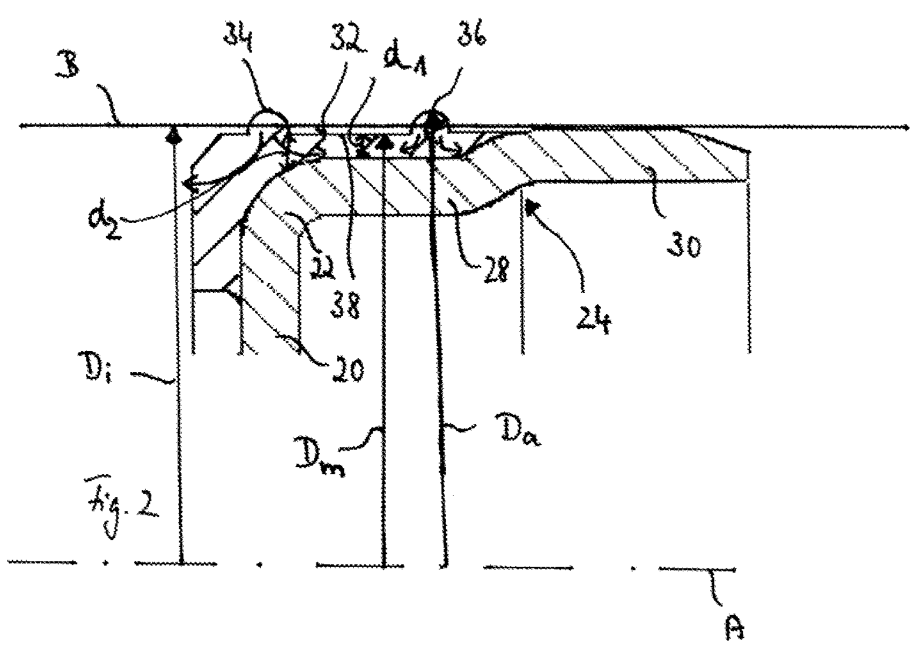
FIG. 2 is a detailed view of a portion of the radial shaft seal ring of FIG. 1.

On the other hand, the static seal element 6 ensures a sealing with respect to a bore B indicated in FIG. 2 or a fixed housing, wherein no movement is provided between the static seal element and the housing receiving the radial shaft seal ring 1. The static seal element 6 includes a radial seal element section 16 and an axial seal element section 18 that are arranged such that they extend from a radially extending radial part 20 of the support body 2 over a curved connecting part 22 of the support body 2 to an axially extending axial part 24 of the support body 2.

As can furthermore be seen from FIG. 1, the axial seal element section 18 at least partially radially outwardly surrounds an outer surface 26 of the axial part 24 of the support body 2, while the radial seal element section 16 radially abuts against the radial part 20 of the support body 2 so that the static seal element 6 extends from the axial part 24 of the support body 2 over the curved connecting part 22 to the radial part 20 of the support body 2.

FIG. 1 furthermore shows that the support body 2, more precisely the axial part 24, includes a first axial part section 28 and a second axial part section 30, the first section 28 being offset radially inward with respect to the second section 30. That is the first axial part section 28 has a smaller outer diameter than the second axial part section 30. The axial seal element section 18 is in turn received in the space between the first axial part section 28 and the bore B while the second axial part section 30 directly contacts the bore B.

In order to ensure a sealing between bore B and radial shaft seal ring 1, a first seal bead 34 is provided on an outer surface 32 of the axial seal element section 18 in a region of the curved connecting part 22. That is, at least part of the first seal bead 21 is located directly radially outwardly of the curved connecting part 22. In order to ensure that even with large loads, for example, due to high pressures, a sealing of the bore B is provided in the region of the static seal element 6, a second seal bead 36 may also provided on an end of the axial seal element section 18 opposite the first seal bead 34, that is, an end of the first axial part section 28 that is near the second axial part section 30.

As shown in FIG. 2, the first seal bead 34 and the second seal bead 36 are configured such that their outer diameter $D_a$ is larger than an inner diameter $D_i$ of the bore B. FIG. 2 furthermore shows that a central region 38 disposed between first and second seal bead 34, 36 has a smaller diameter $D_m$ than the inner bore $D_i$. Here FIG. 2 shows in a dashed manner the course of a central axis A of the radial shaft seal ring 1.

It can furthermore be seen from FIG. 2 that the axially extending outer surface 32 of the axial seal element section 18 extends along the axial part 24 of the support body 2 up to almost over the connecting part 22, the axial seal element section having a material thickness $d_1$ in the region of the axial part 28 of the support body 2. This material thickness d of the axial seal element section 18 gradually increases in the region of the connecting part 22 due to the curved shape of the curved connecting part 22 (thickness $d_2$). Here the first seal bead 34 is arranged such that it is disposed completely in the region of the increasing thickness. Such an arrangement makes possible a particularly good yielding of the elastomer material during the installation process and at the same time a good return force and installation force that ensures a secure sealing of the seal element in the bore.

As can furthermore be clearly seen from FIG. 2, the central region 38 of the axial seal element section 18 between the first seal bead 34 and second seal bead 36 is spaced from the bore B and the axial seal element section 18 only contacts the bore B at the second axial part section 30 of the support body 2 and at the first and second seal beads 34, 36.

As furthermore indicated in FIG. 2, the material of the seal bead 34, 36 (see arrows) can deviate into the neighboring environments during installation so that the installation force that is needed is uniform even as the radial shaft seal ring 1 enters into the bore B. Here the two seal beads 34 and 36 do not get in each other's way during the installation, and the entire space in the central region 38 of the axial seal element section 18 includes only a single seal bead 36.

On the other hand, the first seal bead 34 can extend both radially inward and radially outward due to its placement in the region of the connecting part 22. Due to the formation of the first seal bead 34 in the region of the curved connecting part 22, during the installation of the radial shaft seal ring 1 in the bore B it can be ensured that the overlapping material of the seal bead 34 can be pressed into the surrounding regions, and sufficient space is provided for the deformation of the first seal bead without overly increasing the installation force. Since only the seal beads 34, 36 have a contact with the bore in which the radial shaft seal ring 1 is received, while the central section 38 is spaced from the inner diameter of the bore, on the one hand a sufficient sealing can be achieved, and on the other hand the installation force can be reduced.

As indicated in FIG. 2, the second section 30 of the support body can also have an overlap with respect to the inner diameter of the bore (have a larger outer diameter than the inner diameter of the bore) so that even here a particularly good seat can be achieved between radial shaft seal ring 1 and bore B.

Overall, due to the arrangement of the first seal bead 36 in the region of the curved connecting part 22, and furthermore due to the optional use of a second sealing bead 36 spaced from the first seal bead, a uniform distribution/accommodation of the elastomer material in the axial seal section of the seal element can be achieved. This uniform distribution of the elastomer material on the outer diameter in turn contributes to the return effect and to minimizing a possible tearing of the elastomer material, and to reducing and to homogenizing the installation force overall.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved shaft seals.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Radial shaft seal ring
2 Support body
4 Seal body
6 Static seal element
8 Dynamic seal element
10, 12 Seal lips
14 Ring spring
16 Radial seal element section of the static seal element
18 Axial seal element section of the static seal element
Radial part of the support body
22 Connecting part of the support body
24 Axial part of the support body
26 Outer surface of the axial part of the support body
28 First axial part section
Second axial part section
32 Axial outer surface of the axial seal element section
34 First seal bead
36 Second seal bead
38 Central region between seal beads
d Material thickness of the axial seal element section
$D_i$ Inner diameter of the bore
B Bore
$D_m$ Central region diameter
$D_a$ Static seal element outer diameter
A Central axis

What is claimed is:

1. A radial shaft seal ring for sealing a space between a shaft and a bore in a housing, the shaft seal ring comprising:

a support body having an axial part extending substantially axially and a radial part extending substantially radially and a curved connecting part connecting the axial part to the radial part, the axial part further comprising a first axial section extending from an end of the curved connecting part to a first side of a transition section and a second axial section extending from a second side of the transition section away from the first axial section, an outer diameter of the second axial section being greater than an outer diameter of the first axial section, and a seal body mounted on the support body, the seal body including a static seal element configured to seal between the support body and the bore and a dynamic seal element having at least one seal lip configured to sealingly abut against the shaft, wherein the static seal element extends from the first axial section over the connecting part to the radial part of the support body and the static seal element includes an axial seal element section radially outwardly surrounding at least a portion of an outer surface of the first axial section and a radial seal element section abutting against the radial part of the support body, wherein a radially outer surface of the axial seal element section includes a radially outwardly directed first seal bead and a radially outwardly directed second seal bead, at least a portion of the first seal bead being located directly radially outward of the curved connecting part, wherein a radially outer surface of the second axial section of the axial part is exposed, and wherein the second seal bead is axially spaced from the first seal bead by a cylindrical portion of the radial outer surface having an axial length greater than an axial length of the first seal bead and greater than an axial length of the second seal bead.

2. The radial shaft seal according to claim 1, wherein the entire first seal bead is located directly radially outwardly of the curved connecting part.

3. The radial shaft seal ring according to claim 1, wherein the static seal element has a first radial thickness radially outward of the axial part of the support body and a second radial thickness radially outward of the curved connecting part, the second thickness being greater than the first thickness.

4. The radial shaft seal ring according to claim 3, wherein a minimum radial thickness of the static seal element radially inward of the first seal bead is greater than the first thickness.

5. The radial shaft seal ring according to claim 2, wherein a radial thickness of the static seal element radially outward of the curved connecting part increases from a junction of the axial part of the support body and the curved connecting part in a direction away from the junction of the axial part of the support body and the curved connecting part.

6. The radial shaft seal ring according to claim 1, wherein the axial seal element section has a substantially constant radial thickness in a region between first seal bead and the second seal bead.

7. The radial shaft seal ring according to claim 1, wherein the axial seal element section has a first end at the transitions section and covers the entire first axial section.

8. The radial shaft seal ring according to claim 7, wherein the first seal bead and the second seal bead are the only seal beads on the axial seal element section.

9. A system comprising:

a housing having a bore, the bore having an inner diameter, and a radial shaft seal ring according to claim 1 mounted in the bore, wherein the radial outer surface of the second axial section is in direct contact with the bore, wherein the first seal bead and the second seal bead are in direct contact with the bore, and wherein an outer diameter of the axial seal element section at a location between the first seal bead and the second seal bead is less than the inner diameter of the bore.

10. The system according to claim 9, wherein the first seal bead and the second seal bead are the only seal beads on the axial seal element section.

11. The system according to claim 9, including a ring spring mounted on and surrounding the dynamic seal element, at least a portion of the ring spring being located directly radially inward from the cylindrical portion of the radially outer surface.

* * * * *